United States Patent [19]

Bullat

[11] Patent Number: 4,706,550
[45] Date of Patent: Nov. 17, 1987

[54] METAL MATRIX COMPOSITE PISTON HEAD AND METHOD OF FABRICATION

[75] Inventor: David M. Bullat, Carlsbad, Calif.

[73] Assignee: The United States of America as represented by the Secretary of the Navy, Washington, D.C.

[21] Appl. No.: 817,302

[22] Filed: Jan. 9, 1986

[51] Int. Cl.[4] ............................ F16J 1/00; F16J 1/04; B23P 15/10

[52] U.S. Cl. ............................... 92/260; 29/156.5 R; 29/428; 29/DIG. 2; 29/DIG. 48; 92/212; 92/213; 92/222; 92/231; 92/248; 123/193 P; 419/61; 228/113

[58] Field of Search ............ 29/156.5 R, 428, DIG. 2, 29/DIG. 48; 92/212, 213, 222, 231, 248, 260; 123/193 P; 419/61; 228/112, 113

[56] References Cited

U.S. PATENT DOCUMENTS

| | | | |
|---|---|---|---|
| 2,833,264 | 5/1958 | Dailey et al. | 123/193 CP |
| 3,128,523 | 10/1964 | Whitfield et al. | 92/213 |
| 3,596,571 | 8/1971 | Hill et al. | 92/231 |
| 3,911,891 | 10/1975 | Dowell | 92/213 |
| 3,914,574 | 10/1975 | Hill et al. | 92/260 |
| 4,334,507 | 6/1982 | Kohnert et al. | 92/213 |
| 4,498,219 | 2/1985 | Ban et al. | 29/156.5 R |
| 4,651,630 | 3/1987 | Zeilinger et al. | 92/212 |
| 4,651,631 | 3/1987 | Avezou | 29/156.5 R X |
| 4,677,901 | 7/1987 | Ban et al. | 29/156.5 R X |
| 4,679,493 | 7/1987 | Munro et al. | 92/213 X |

Primary Examiner—Howard N. Goldberg
Assistant Examiner—Ronald S. Wallace
Attorney, Agent, or Firm—Johnson Ervin F.; Thomas Glenn Keough

[57] ABSTRACT

An aluminum torpedo piston is provided with a piston head fabricated from a metal matrix composite material composed of aluminum and silicon carbide fibers that are integrally joined by an inertial welding technique. A 23% weight of silicon carbide fibers to powdered aluminum was selected. Resistance to intense heating which would otherwise cause melting and erosion of the piston is avoided to permit longer, high speed runs.

4 Claims, 7 Drawing Figures

METAL MATRIX COMPOSITE PISTON HEAD AND METHOD OF FABRICATION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Reciprocating engines have been in a constant state of evolution ever since their initial conception. The uses and applications of a host of different designs have appeared to be limited only by the ingenuity and needs of designers and engineers. A somewhat recent development included incorporating the reciprocating pistons in undersea torpedoes. Aluminum and alluminum alloy pistons work satisfactorily in some torpedo designs. They have, however, a relatively short operational life since the intense heating causes melting and erosion in the upper portion of the piston. This has been noted in many practice torpedoes since they routinely are overhauled and the pistons changed after only five torpedo runs. This is an unduly time consuming and costly procedure and should be avoided if possible.

Historically, heat resistant coatings have long been applied to pistons to extend their useful life. The U.S. Pat. No. 2,833,264 to J. J. Daly et al sprays a molten molybdenum coating onto an aluminum piston to enhance heat transfer. M. G. Whitfield et al in U.S. Pat. No. 3,152,523 cast a titanium cap onto an aluminum piston with the hopes of withstanding the high operating temperatures. A still later attempt to improve piston life for an internal combustion engine is shown in U.S. Pat. No. 3,596,571 to L. T. Hill et al. Aluminum-copper-nickel-manganese alloy caps, sintered aluminum caps, copper alloy caps, nickel alloy caps or steel caps are friction welded onto an aluminum piston. The caps provide for increased heat resistance and can be fashioned to help define an internal cooling cavity that helps dissipate heat. Robert D. Downell in U.S. Pat. No. 3,911,891 deposited a nickel alloy layer, a combination nickel aluminum alloy and refractory zirconium oxide layer, and a zirconium oxide layer onto the head of a piston using a plasma flame spray process. This laminate on the piston head is said to enable operation at greater temperatures than an untreated head. Another plasma sparying technique shown in U.S. Pat. No. 3,914,574 applies a wear resistant coating of cast iron, chromium, molybdenum or nickel or grooved surfaces of a two-part piston. Still another piston fabrication technique is shown in U.S. Pat. No. 4,334,507 and casts an aluminum or aluminum alloy body on a higher stress withstanding material such as a sintered chromium nickel steel, nickel chromium alloy, nickel and nickel iron alloy or copper or bronze. This combined material selection is said to increase mechanical bonding between them to produce a stronger piston. While this listing of fabrication techniques is not intended to be exhaustive, it is typical of the variety of approaches which have been relied upon in the past to improve the lifetime expectancy of aluminum and aluminum alloy pistons. All have contributed to advancing the state-of-the-art yet optimization and further improvements are needed to meet the requirements for higher operating temperatures for longer periods of times as demanded by an emerging generation of torpedoes.

Thus, a continuing need in the state-of-the-art exists for a method and apparatus for improving the life expectancy of aluminum pistons included in current high performance torpedoes.

SUMMARY OF THE INVENTION

The present invention is directed to providing an improvement for an internal combustion engine having hot working gases displacing at least one reciprocating aluminum piston. A metal matrix composite piston head is inertially welded onto the piston. The piston is fabricated from aluminum and the metal matrix composite piston head has an aluminum-silicon carbide composition in which there is a 23% weight silicon carbide fiber composition. The method embraces the mixing of a metal matrix composite having a composition of 23% weight of silicon carbide fibers with powdered aluminum, pressing the mixed metal matrix composite to a billet form having nearly the same diameter as the aluminum piston and impact welding the billet to form a metal matrix composite head on the aluminum piston.

A prime object is to provide for an improved aluminum piston having a reduced maintenance and associated costs.

Another object of the invention is to provide for an increased life of aluminum pistons by including a metal matrix composite head.

Another object of the invention is to provide for an improved life piston fabricated from aluminum having an aluminun-silicon carbide fiber composition piston head.

Another object is to provide for an improved operational life aluminum piston having a metal matrix composite head impact welded on the piston.

Yet another object is to provide for an improved life aluminum piston having an impact welded 23% weight silicon carbide fiber-aluminum composition piston head.

These and other objects of the invention will become more readily apparent from the ensuing description and claims when taken in conjunction with the appended drawings.

DESCRIPTION OF THE PREFERRED EMBODIMENT

Figure 1:
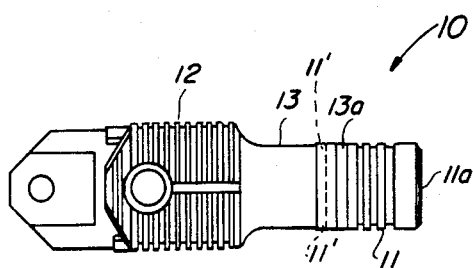
FIG. 1 shows a side view of a typical hot gas piston to be modified in accordance with the teachings of this inventive concept.

Referring now to FIG. 1 of the drawings a typical piston 10 is shown having a piston head section 11 that will be cut off, generally along lines 11'—11', and replaced with a metal matrix composite head 15, see FIG.

5, fabricated in accordance with the teachings of this inventive concept. The piston head and its metal matrix composite head 15, are appropriately machined to support rings and is properly sized to reciprocate within an appropriately dimensioned cylinder. Hot gases contacting a surface 11a displace an enlarged section 12 of the piston which also is fitted into an appropriate bore. A wrist pin and crank assembly, not shown, provide the necessary translation from reciprocal-to-rotary motion to propel a torpedo via single or counter rotating propellers.

As is usually the case with a compact, highly efficient prime mover of this type, the piston arrangement and the crank assembly are precisely engineered to assure the most efficient energy transmission from the exploding fuel from along face 11a to the load imposed at the propellers. Usually this means that mass constraints including proper mechanical impedance loading is maintained within a predetermined range. In some instances, as in the case with high performance torpedoes, the mass of the piston must be kept within certain limits.

Aluminum long has been used for the fabrication of pistons. However, it has been recognized that aluminum can be damaged when exposed to intense heating. This is particularly true regarding melting and excessive erosion in the area of surface 11a. For this reason this inventive concept has called for replacing of the piston head 11 generally along lines 11'—11 shown in FIG. 1 and the inertial welding of a metal matrix composite piston head 15 in its place, see FIGS. 4 and 5.

Figure 2:
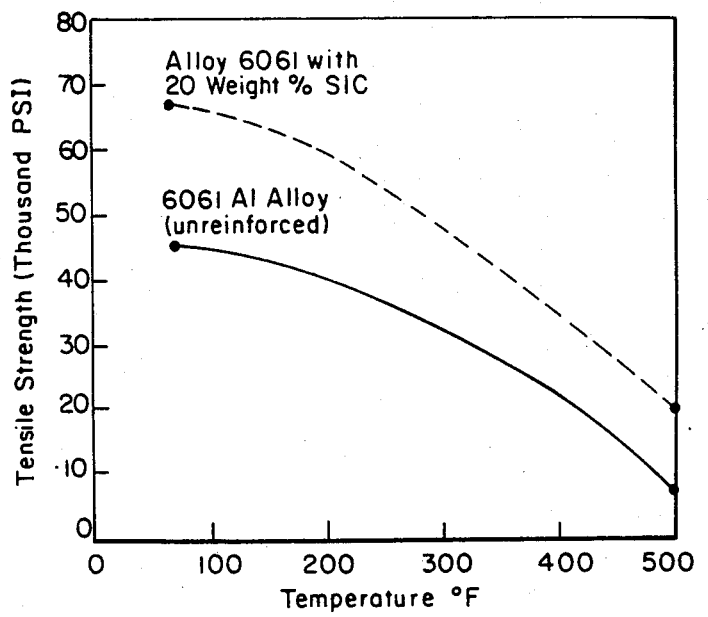
FIG. 2 shows a graph setting forth the relative characteristics of silicon carbide reinforced aluminum alloy as compared to unreinforced aluminum.

Looking now to FIG. 2 a suitable material has been found which has the desired characteristics and which lends itself to the impact welding process. This material is an alloy of aluminum designated aluminum alloy 6061 that has been cast with 20% weight of silicon carbide fibers. It is manufactured by ARCO Metals Company-SILAG Operation with a designation 5051-T6/20 volume percent (v/o) F-9 silicon carbide whisker bar. Powdered aluminum alloy 6061 is combined with 20% of the silicon carbide fibers and mixed thoroughly. It is pressed into a cylindrical billet form and extruded into a metal matrix composite piece 15 having a shape with a diameter that is larger or the same as the top portion 11. Having the piston modified to include the metal matrix composite assures significant weight and performance advantages which include a very favorable strength-to-weight ratio with nearly isotropic properties and increased heat resistance.

Some of these properties are shown for relative temperature strengths in FIG. 2. Greater temperature strengths mean extended periods of wear when compared to unreinforced 6061 aluminum alloy. As noted, the tensile strengths of the metal matrix composite are significantly greater than that of the unreinforced material. This means that a modified piston having a metal matrix composite head 15 will last longer and have improved operating characteristics without greatly changing the piston's mass, with respect to a conventional piston having an aluminum head.

Figure 3:
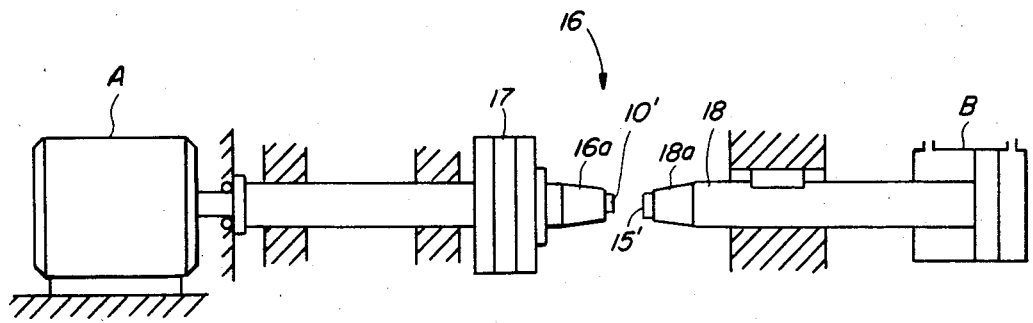
FIG. 3 depicts a plot of rotational speed, torque and upset during inertial welding.

Inertial welding is performed by frictional heating in accordance with well established techniques. A modified lathe with a drive motor A and hydraulic ram B is used for inertial welding, see FIG. 3. A spindle chuck 16 holds pistons 10' having its piston head removed in chuck jaws 16a. Optionally, the metal matrix composite could be held in chuck jaw 16. The other pieces, the piston-head removed piston 10' or metal matrix composite piece 15' is held in a stationary tail stock 18 having suitable jaws 18a that are adjustable to securely hold a piece. The jaws of the rotating chuck and the stationary tail stock are axially aligned in an opposing relationship so that their secured pieces are also axially aligned in an opposing relationship. A flywheel 17 is secured to spindle chuck 16 to provide an additional rotational inertial mass. The piece clamped in the spindle chuck is rotated at a high speed. When a predetermined rotational speed is reached, the driving power is cut from motor A and the workpieces are thrust together by hydraulic ram B. As the flywheel connected to the spindle chuck decelerates, the stored energy is converted to frictional heat and contacting faces 13a and 15a of piston and metal matrix composite piston head are heated and softened. Just before rotation ceases the two parts bond together. The remaining flywheel energy hot works the metal interface between surfaces 13a and 15a expelling any impurities or voids and refining grain structure. The weld is complete when the flywheel stops.

Figure 4:
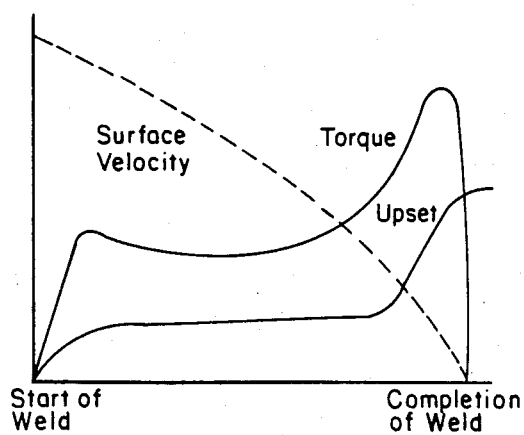
FIG. 4 shows a functional representation of a typical apparatus employed for an inertial welding operation having the piston and composite head billet form mounted in place.

FIG. 4 depicts the interaction of the physical parameters involved. The curves start at the time the workpieces come into contact. At first, there is a small torque peak and a corresponding change in the length of the parts. This change is called upset. During this phase, the initial temperature buildup occurs. Torque is reduced and remains fairly constant. Next, a state of near equilibrium exists during which energy from the rotating mass is being converted to heat at approximately the same rate as it is being conducted away. Little upset occurs during this period. When rotational speed drops to a point at which heat dissipation exceeds heat generation, the weld surfaces cool slightly. Torque peaks sharply, and the weld is completed. Most of the upset takes place just before the flywheel stops.

Figure 5:
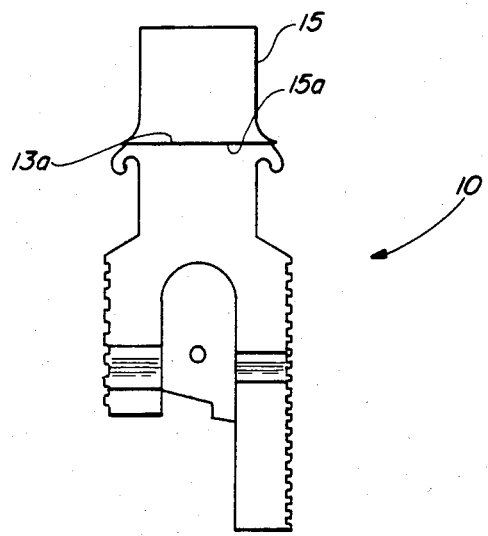
FIG. 5 shows a cross-sectional view of the impact welded piston and composite head prior to machining.

The briefly described process above is known as "rotational forging". The weld formed is a strong, solid state bond. Plastic metal is squeezed out before melting can occur. The weld zone is very narrow and has a fine grained structure and appears substantially as shown in FIG. 5. Only a small volume of metal is heated that is adjacent surfaces 13a and 15a. The metal adjacent to this small volume acts as a heat sink to quench the weld zone. The piston-shaped piece of metal matrix composite piston head 15 next is machined along the 13a-15a joint to remove the ring of flash metal extruded radially outwardly. The axially converging pressure between rotating chuck 16 and stationary tail stock 18 and flywheel rpm is proportional to the cross-sectional area of the pieces being inertially welded. Ring machining, plating and finish machining brought the modified pistons within useful tolerances.

Figure 6A:
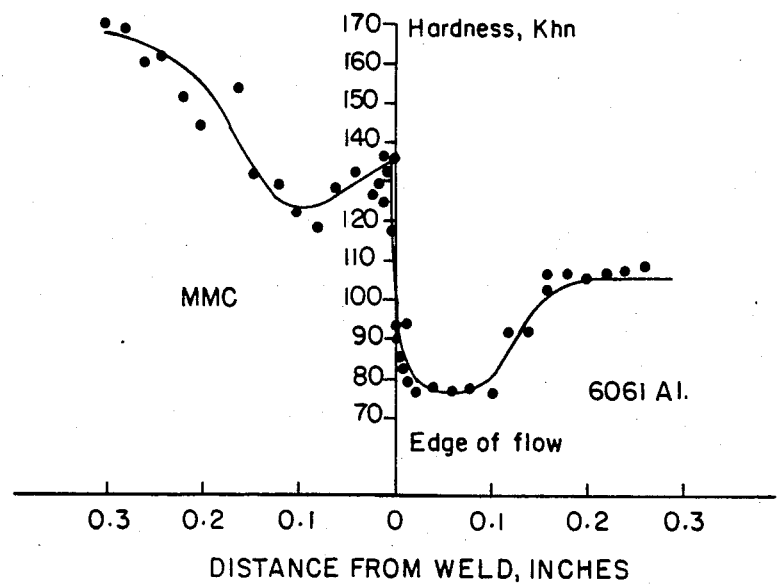
FIGS. 6a and 6b are graphs that provide an indication of the quality of the inertial weld.
Figure 6B:
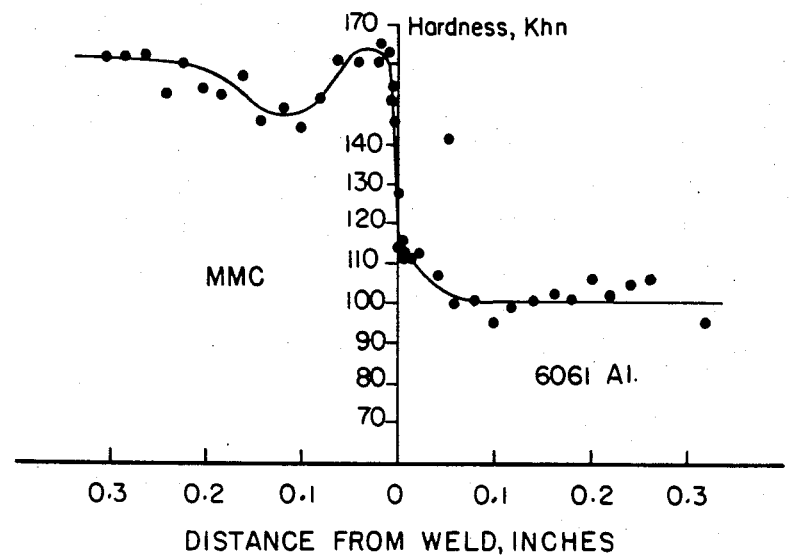

Hardness testing of the modified pistons revealed that neither the aluminum nor the aluminum-silicon carbide fiber composition was as hard in the vicinity of the weld as in the unaffected areas or at the weld (fusion) line. Aging the specimens for eighteen hours at 320° F. (standard 6061 aging) restored linearity to the aluminum hardness vs. distance curve of FIGS. 6a and 6b, but a dip remained in the plot for the metal matrix composite. It was expected that the heat-affected zone near the weld would not respond to aging, and the behavior observed remains unexplained.

The modified pistons having the aluminum-silicon carbide fiber composition piston head were solution-treated and allowed to age naturally for five days or aged at 320° F. for eighteen hours. This treatment restored the aluminum to full hardness, but in some case the metal matrix composite was not fully hardened in the area near the fusion line. Along with the earlier observations, there is a suggestion that the silicon fibers might have been damaged during the welding process, a result of fiber breakup due to mechanical working or to heat-induced interaction of the fibers and the matrix; however, examination of the fibers with a scanning electron microscope revealed no differences in fibers in three areas of one specimen. Examination of the weld interfaces by means of optical microscopy and the scanning electron microscope show very good bonds and no void areas.

The modified pistons having an aluminum-silicon carbide fiber composition of 23% silicon carbide fibers assured increased operational time and yet did not compromise the capabilities of the other components of the torpodo's propulsion system. This indicates that mechanical impedances were properly matched to that of an unmodified piston so that increased operational capabilities of the torpedo not compromised by adding the metal matrix component head. The increased capability in performance time was at low cost and modifications were performed within a reproducible manufacturing format. Reliability was not adversely affected but was increased.

Obviously many modifications and variations of the present invention are possible in the light of the above teachings. It is therefore to be understood that within the scope of the appended claims the invention may be practiced otherwise than as specifically described.

What is claimed is:

1. In a torpedo having hot working gases therein displacing at least one reciprocating aluminum piston, an improvement thereof is provided comprising:
   a metal matrix composite piston head inertially welded onto the aluminum piston, the piston head having an aluminum-silicon carbide fiber composition.

2. In the apparatus according to claim 1 in which the aluminum-silicon carbide fiber composition is 23% weight silicon carbide fibers in an aluminum matrix.

3. A method of improving the heat resistance and life expectancy of an aluminum piston comprising:
   mixing a metal matrix composite of silicon carbide fibers to powdered aluminum;
   press-forming the mixed metal matrix composite to a piston head billet form having diameter at least the same as the aluminum piston; and
   impact welding the metal matrix composite piston head onto the aluminum piston.

4. A method according to claim 3 in which the step of mixing includes the selection of a composition of 23% weight of silicon carbide fibers to powdered aluminum.

* * * * *